United States Patent
Liu

(10) Patent No.: US 8,240,845 B2
(45) Date of Patent: Aug. 14, 2012

(54) EYEGLASSES

(75) Inventor: Wei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 188 days.

(21) Appl. No.: 12/796,645

(22) Filed: Jun. 8, 2010

(65) Prior Publication Data

US 2011/0187986 A1    Aug. 4, 2011

(30) Foreign Application Priority Data

Feb. 2, 2010  (CN) .......................... 2010 1 0301109

(51) Int. Cl.
*G02C 9/00*    (2006.01)
(52) U.S. Cl. ................ 351/47; 351/57; 351/86
(58) Field of Classification Search ............... 351/86, 351/106, 83, 103, 124, 90, 91, 92, 41, 158, 351/47, 57
See application file for complete search history.

(56) References Cited

U.S. PATENT DOCUMENTS

| 3,552,840 | A  | * | 1/1971 | Braget ........................... 351/154 |
| 6,848,786 | B1 | * | 2/2005 | Teng .............................. 351/83 |
| 7,399,078 | B2 | * | 7/2008 | Sheldon ......................... 351/57 |

* cited by examiner

*Primary Examiner* — Hung Dang
(74) *Attorney, Agent, or Firm* — Altis Law Group, Inc.

(57) ABSTRACT

A pair of eyeglasses includes a pair of lenses, an outer border, and a pair of temple arms. The outer border includes two symmetrical mounting portions and a bridging portion linking up the two mounting portions. Each of the mounting portions defines a first through-hole. The outer border further includes a pair of alignment recesses respectively encircling each of the first through-hole and a pair of fixing portions, wherein each of the fixing portions is next to one of the alignment recesses, and the lenses are anchored at the alignment recesses. The eyeglasses further include a pair of inner borders respectively anchored at each of the fixing portions. When the lenses are installed in the alignment recesses, each of the inner borders is anchored at each of the fixing portions and exerted to the edge of the lenses.

6 Claims, 2 Drawing Sheets

EYEGLASSES

BACKGROUND

1. Technical Field

The present disclosure relates to eyeglasses.

2. Description of the Related Art

Generally speaking, lenses of the eyeglasses are becoming thinner and thinner. However, such thin lenses are easily damaged at their edges when being installed to the eyeglasses frame which are necessarily designed to provide a very tight fit for the lenses.

Therefore, there is room for improvement within the art.

BRIEF DESCRIPTION OF THE DRAWINGS

The components in the drawings are not necessarily drawn to scale, the emphasis instead being placed upon clearly illustrating the principles of a pair of eyeglasses. Moreover, in the drawings, like reference numerals designate corresponding parts throughout the several views.

DETAILED DESCRIPTION

Figure 1:
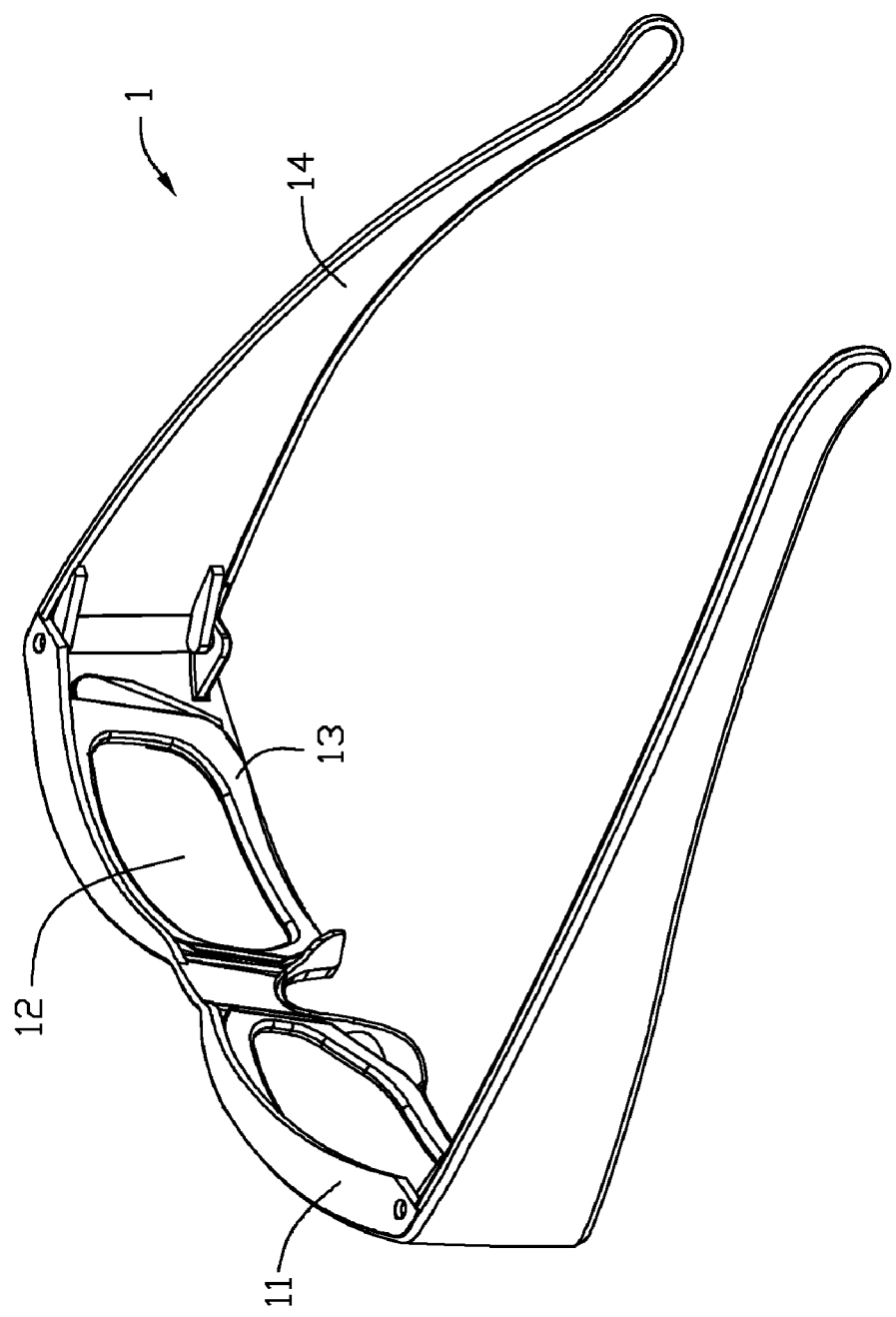
FIG. 1 is an isometric view of a pair of eyeglasses in accordance with an exemplary embodiment.

Referring to FIG. 1, a pair of eyeglasses 1, according to an exemplary embodiment, includes an outer border 11, a pair of inner borders 13, a pair of temple arms 14, and a pair of lenses 12 respectively installed between the outer border 11 and one of the inner borders 13.

Figure 2:
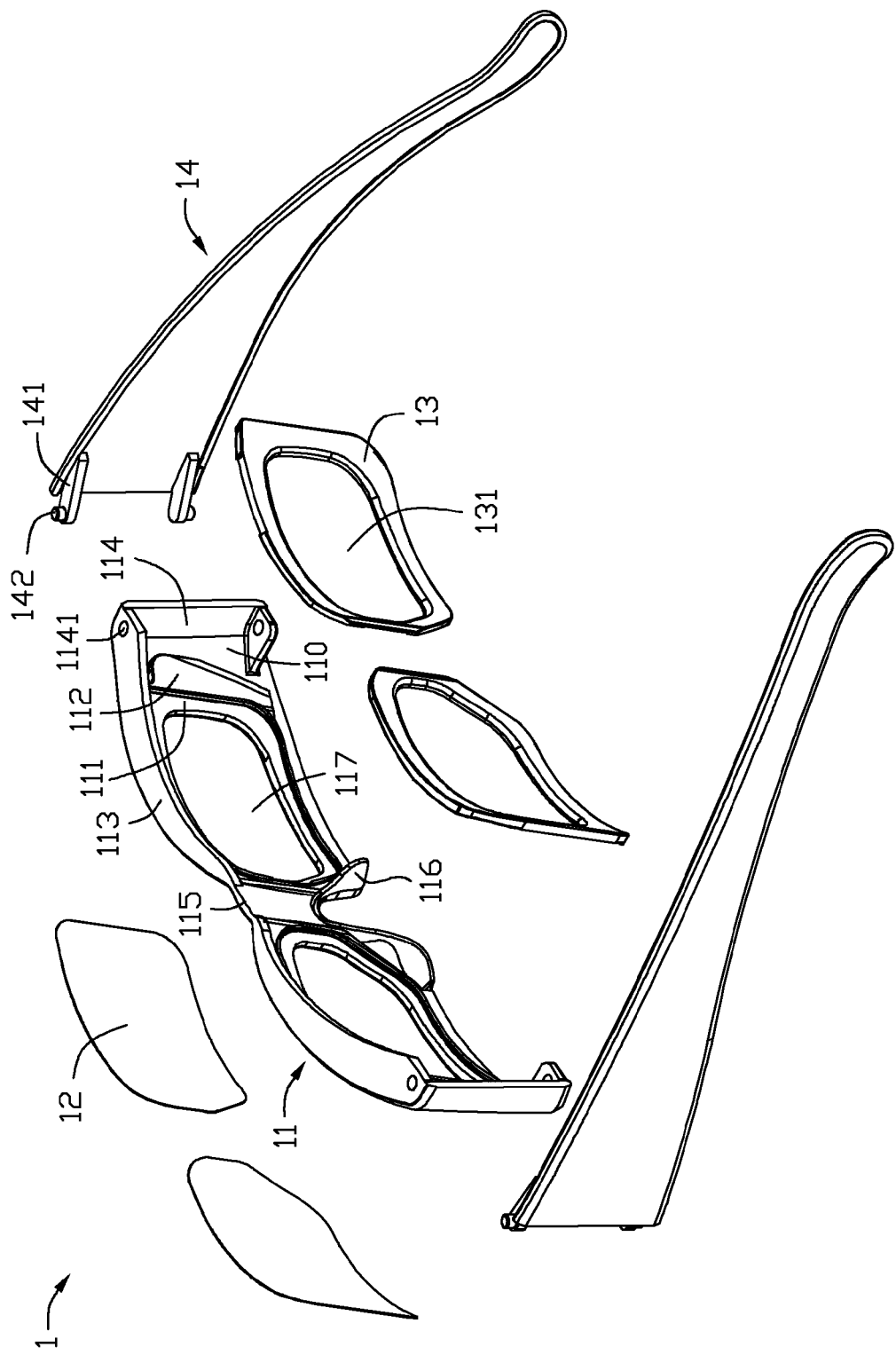
FIG. 2 is an exploded, perspective view of the eyeglasses of FIG. 1.

Referring also to FIG. 2, the outer border 11 includes a pair of symmetrical and enclosed mounting portions 110, a bridging portion 115 linking up the two mounting portions 110, a pair of pivot portions 114 respectively installed to one side of each mounting portion 110, and a pair of nose pads 116. The pivot portions 114 are installed to the distal sides of the mounting portions 110, and each of the nose pads 116 extends from a periphery of the other side of each mounting portion 110.

Each of the mounting portion 110 defines a first through-hole 117 encircled by the edge of the mounting portion 110, and an alignment recess 111 encircling the edge of the first through-hole 117 and facing the inner border 13. The depth and the size of the alignment recess 111 respectively match the thickness and the size of the lenses 12. The outer border 11 further includes a pair of fixing portions 112 and a pair of baffles 113. Each of the fixing portions 112 is respectively located at the two un-adjacent sides of each of the alignment recess 111. Each of the baffles 113 extends from the upper edge of each mounting portion 110 and towards the extending direction of the temple arms 14. When users wear the eyeglasses 1, the baffles 13 resist against the face above the eyes and block light.

Each of the inner borders 13 defines a second through-hole 131 encircled by the inner border 13. The size of each second through-hole 131 respectively matches the size of each first through-hole 117. After the lenses 12 are installed in the alignment recesses 111, each of the inner borders 13 is anchored at each of the fixing portions 112 and presses the edge of the corresponding lens 12, then the inner border 13 is welded to the fixing portion 112 via ultrasonic welding. Because the lenses 12 are received in the alignment recesses 111, then the inner borders 13 are welded to the fixing portions 112, damage to the edges of the lenses can be prevented.

Each of the pivot portions 114 includes two spaced pivot holes 1141. Each of the temple arms 14 includes a combined portion 141 and a pair of spaced hooks 142. Each of the hooks 142 is inserted into one of the pivot holes 1141 without screws. Thus, the temple arms 14 are installed to the outer border 11 without any screws.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A pair of eyeglasses, comprising:
a pair of lenses;
an outer border comprising:
two symmetrical mounting portions, each of the mounting portions defining a first through-hole surrounded by each of the mounting portions, and an alignment recess surrounding the first through-hole and a fixing portion adjacent to the alignment recess, the lenses anchored in the alignment recesses;
a bridging portion interconnected between the two mounting portions; and
a pair of baffles respectively extending from an upper edge of each mounting portion, wherein the baffles are configured for resisting against the face of a user and blocking outside light interference;
a pair of inner borders respectively anchored at each of the fixing portions and configured for pressing to the edge of a corresponding one of the lenses.

2. The eyeglasses as recited in claim 1, wherein the inner borders are welded to the fixing portions by ultrasonic welding.

3. The eyeglasses as recited in claim 1, wherein the depth and the size of each alignment recess respectively matches the thickness and the size of the corresponding lense.

4. The eyeglasses as recited in claim 1, wherein each of the inner borders defines a second through-hole, wherein the size of each second through-holes respectively matched with the size of each first through-hole.

5. The eyeglasses as recited in claim 1, further comprising a pair of pivot portions respectively installed to one side of each mounting portion, wherein the pivot portions are installed to the distal sides of the mounting portions.

6. The eyeglasses as recited in claim 5, wherein each of the pivot portions comprises two spaced pivot holes; and the eyeglasses further comprises two temple arms, each of the temple arms comprises a combined portion and a pair of spaced hooks, wherein each of the hooks is inserted to one of the pivot holes without screws.

* * * * *